April 9, 1935.  S. A. B. HAMILTON, JR  1,997,057
SPEED CONTROL FOR MOTOR VEHICLES AND THE LIKE
Filed Aug. 18, 1933   3 Sheets-Sheet 2
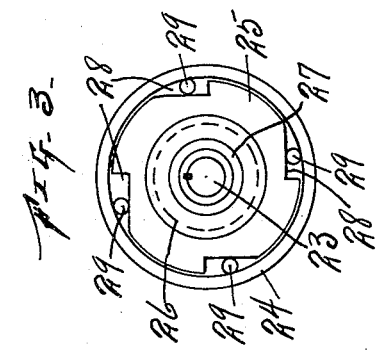
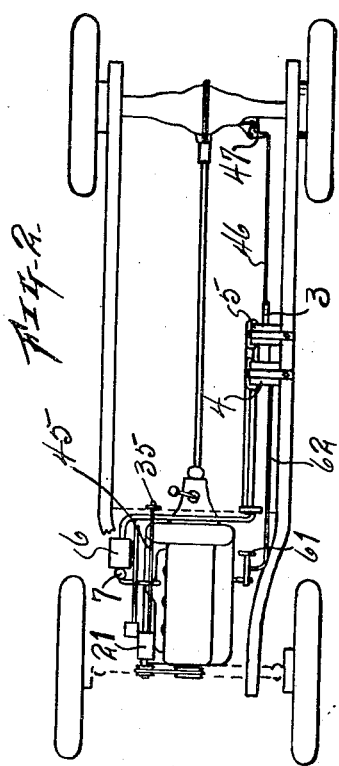
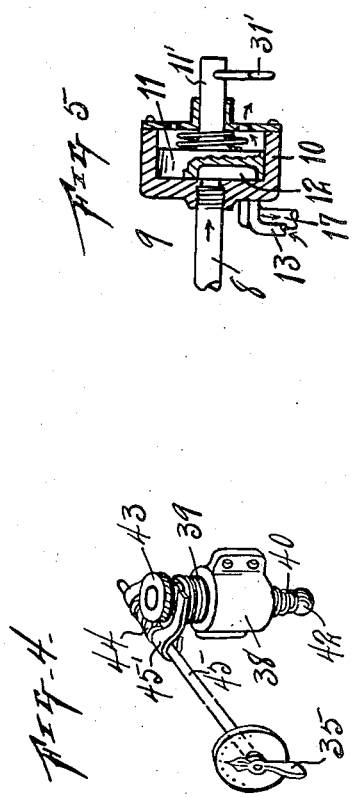
INVENTOR.
S.A.B HAMILTON JR.
BY
ATTORNEYS.

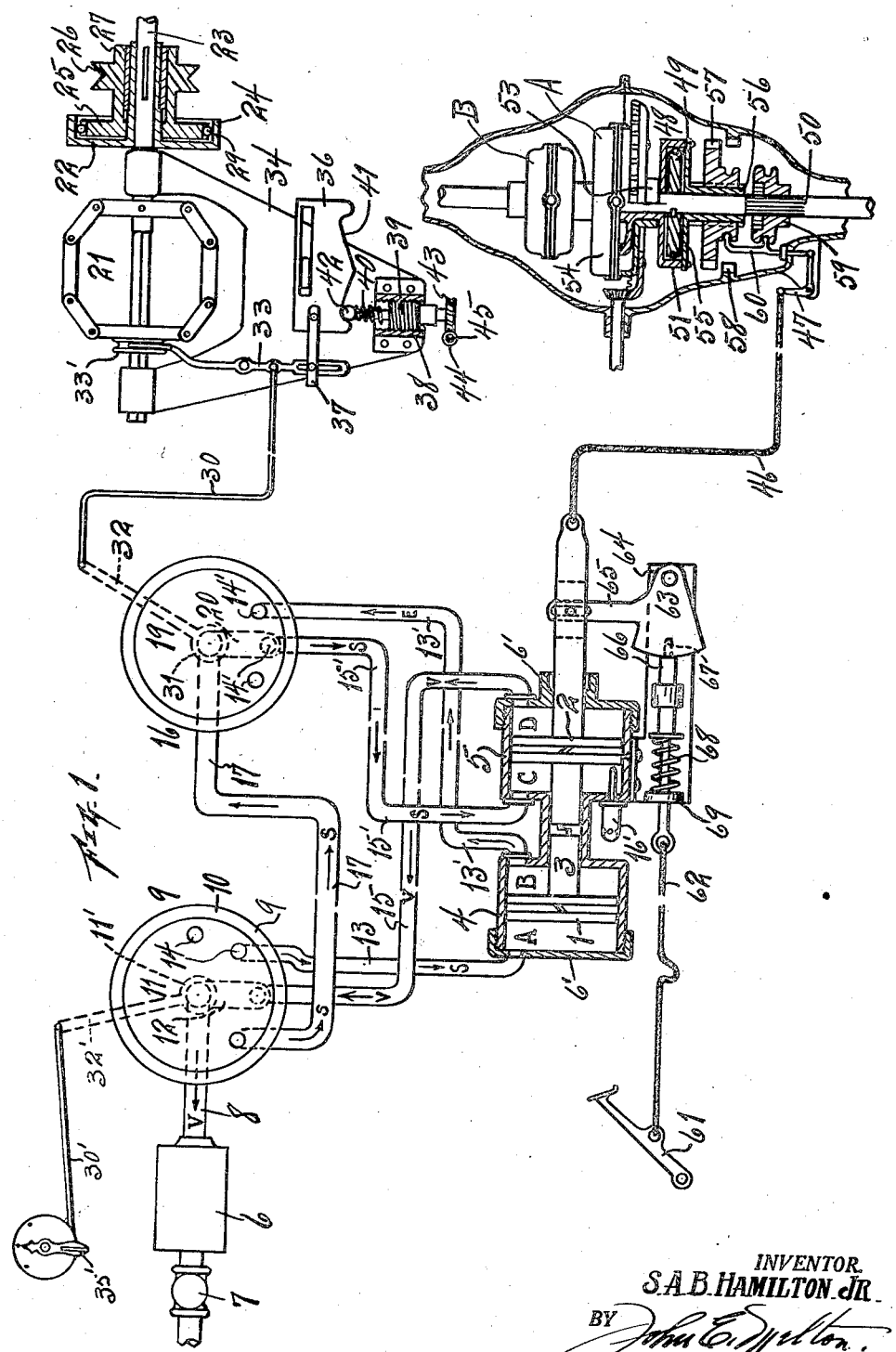

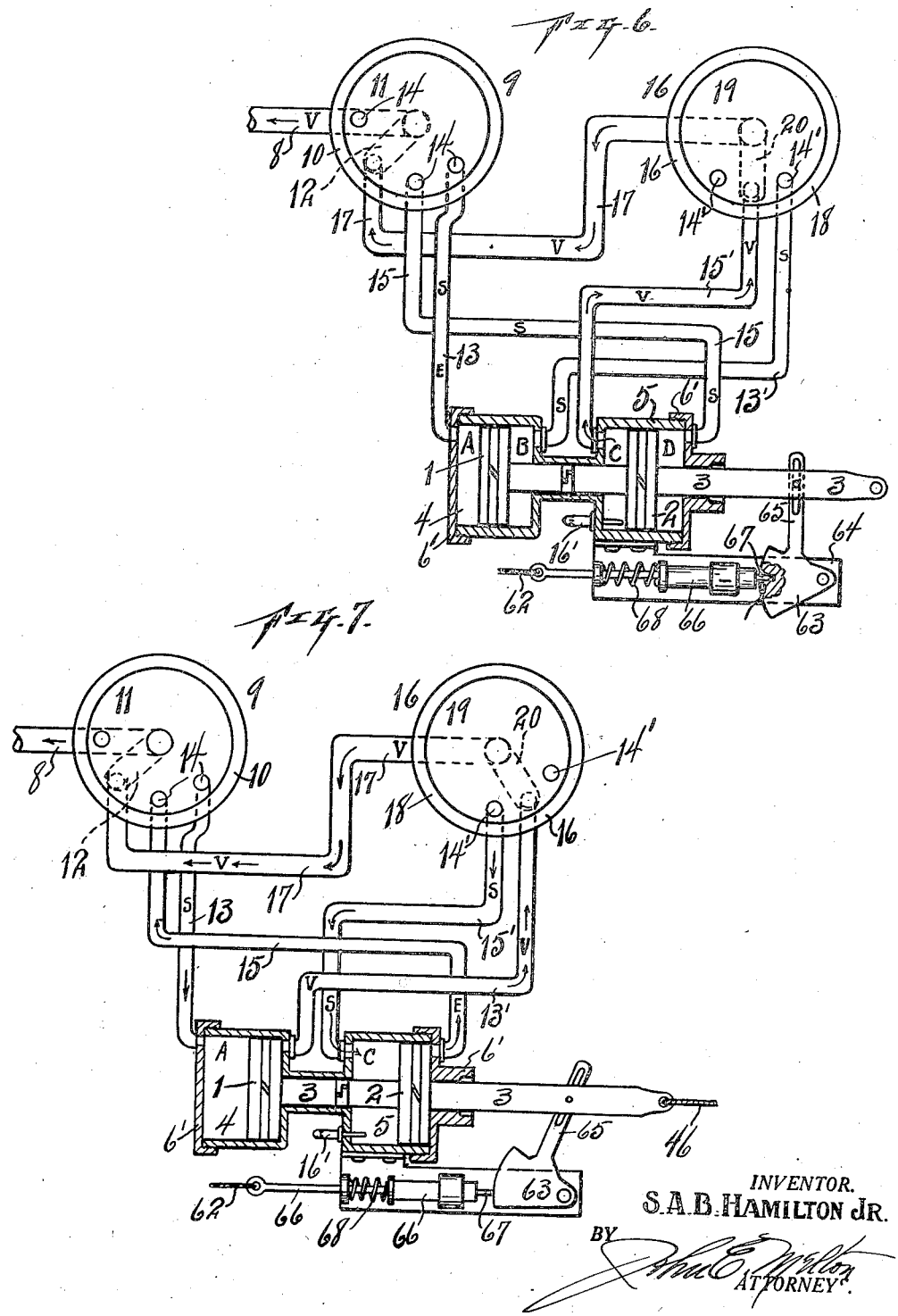

Patented Apr. 9, 1935

1,997,057

UNITED STATES PATENT OFFICE 1,997,057

SPEED CONTROL FOR MOTOR VEHICLES AND THE LIKE

Samuel A. B. Hamilton, Jr., Fort Worth, Tex.

Application August 18, 1933, Serial No. 685,721

18 Claims. (Cl. 74—314)

My invention relates to speed control for motor vehicles and the like, and more particularly to vacuumatic mechanism which will automatically co-act with the gears of a vehicle transmission and position the differential gears so that the operator may drive in his desired differential gear ratio while in any transmission gear. The object is to provide a positive operating compact structure which is adapted to control the speed gears of a vehicle in such a manner as to insure perfect control of a motor vehicle at all times. Another object is to provide a control which may be set by the operator so that he may operate the vehicle in any gear desired throughout the conventional drive while driving in the higher or lower differential ratio gears and set the same so that they will operate automatically in accordance with the momentum of the vehicle and the revolutions of the motor.

An advantage of this device is that it may be set so that it will not hinder the drive of a vehicle in the conventional manner, or it may be set at any time regardless of the forward speed of the vehicle, so that the operator may drive the vehicle in the conventional manner with free-wheeling facilities and also means for increasing or decreasing the ratio of the gearing of the differential of the vehicle relative to the revolutions of the engine. Another advantage of this speed control device is that when it is used to attain a higher speed ratio in the differential, the mechanism of the same is adapted to lock the vehicle against reverse movement should the vehicle stall on an incline. Another advantage of this structure is that provision is made for placing the transmission gears in any gear at any time during the forward movement of the vehicle. Still another advantage is that provision is made for a selective timing of the automatic portion of the structure so that it will only function at the desired speed of the engine relative to the forward speed of the vehicle. Other objects and advantages will be explained in the following description and the invention will be more particularly pointed out in the claims.

Reference is had to the accompanying drawings which form a part of this application.

Fig. 1 is a diagrammatic view of the device, showing the control unit in section, direction of flow of the energizing medium for the same, a partial section of the governor unit, and a partial section of the differential which is operated by the mechanism.

Fig. 2 is a plan view of a vehicle chassis, showing an arrangement of the various parts of the mechanism.

Fig. 3 is a side elevation of the over-riding clutch element for the governor.

Fig. 4 is a detail view of the manual means for controlling the governor movement in accordance with the speed of the motor of the vehicle.

Fig. 5 is a vertical section of one of the valves used for controlling the flow of the power medium to the control unit.

Figs. 6 and 7 are diagrammatical views of the control units positioned in two of their positions and showing the direction of flow of the energizing force.

Similar characters of reference are used to indicate the same parts throughout the several views.

The device consists principally of a vacuum actuated mechanism that is adapted to be manually and automatically governed so as to vary the gear ratio of a specially built differential of a motor vehicle for driving a vehicle in the conventional transmission gears, in either of two differential speeds. The device is so arranged that the operator of the vehicle may change the drive through the differential from the lower to the higher ratio of the same while in any of the forward transmission gears by depressing the clutch of the vehicle, and change the differential ratio from the high to the lower ratio by retarding the accelerator of the motor of the vehicle.

The vacuum actuated device consists of a pair of pistons 1 and 2 carried rigidly in axial alinement upon a shaft 3 and adapted to reciprocate within a cylindrical structure. Each of the pistons 1 and 2 are provided with a cylinder 4 and 5 respectively which are positioned relatively to each other as to provide a bearing space between the two for the reciprocating shaft 3. The end of the cylinders 4 and 5, opposite the bearing space, are each provided with a cap 6'. This structure provides the necessary arrangement of the two cylinders 4 and 5 to permit the pistons to function as double acting pistons, 1 and 2, in their respective cylinders 4 and 5.

A vacuum tank 6 is carried by the vehicle and the vacuum may be maintained in the tank by means of a pipe connection between the tank and the intake manifold of the motor or from some other suitable motive connection. The pipe connection of the manifold and the vacuum tank 6 is provided with a check valve 7. The vacuum tank 6 is provided with a suction pipe 8 which connects with a manually operated valve 9. The pipe 8 is preferably attached to the center of the valve 9 so that the vacuum from the tank may be directed through various channels provided in body of the valve.

The manually operated valve 9 may be positioned at any convenient place relative the reciprocating pistons 1 and 2 and in such a position as to facilitate a remote control of the valve. The valve consists of a cup shaped member 10 which is rigidly positioned and adapted to contain an oscillating core 11 which is adapted to be manually positioned to a plurality of predetermined positions by the operator of the vehicle. The various positions that the valve may be placed governs the position of the pistons within their respective cylinders which, in turn, positions the differential gears of the vehicle.

The cup portion 10 of the valve 9 is connected to the automatic valve 16 by means of a pipe 17 so that the vacuum may be directed through an automatic means for actuating the shaft 3. The manual valve 9 is also provided with pipe connections to the cylinders 4 and 5. These connections consist of pipes which register with the bottom of the cup 10 near the outer periphery thereof and to the cylinders so as to either supply the cylinders with a vacuum pull or relieve the suction or compression set up in the cylinders by the movement of the pistons 1 and 2. A pipe 15' is connected to the cup portion 19 of the automatic valve 16 near the outer periphery and to the end C of the cylinder 5. A pipe 13' has a similar connection between the valve 16 and the end B of the cylinder 4.

The oscillating core 11 of the valve 9 is provided with an elongated slot 12 which radiates from the center of the core 11 out to near the outer periphery thereof and of such a length as to extend from the supply connection 8 out to intermittently register with the other connections 13, 15 and 17 of the cup 10. The slot 12 is in the side of the core 11 adjacent the base of the cup portion 10. The core 11 is also provided with a plurality of openings or holes 14 which are bored axially through the same, near the periphery thereof, and adapted to register with the outlet connections of the cup portion 8. This structure permits the operator of the vehicle to position the core 11 of the valve 9 so that the vacuum may be directed through the various openings or outlets from the valve and at the same time bring the holes 14 in a position to register with the desired outlets in order to open them to the atmosphere.

In Fig. 1 the manually operated valve 9 is positioned so that the vacuum from the tank 6 is directed to the outer end of the cylinder 5 so that the pull will tend to move the pistons into one end of the cylinders or the ends B and D of the cylinders. As the shaft of the pistons 1 and 2 is extended to project through one of the cylinders or the cylinder 5 rearwardly of the vehicle so that it may have connection with the differential of the vehicle the positions of the pistons may be termed as being in a rear position or a forward position respective of the cylinders 4 and 5.

In Fig. 1 the vacuum of the tank 6 is directed to pull the pistons to the rear of their cylinders 4 and 5. As the vacuum is only directed to one side of only one piston at a time the like side of the other piston must be provided with an exhaust means so that the compression of the same will not hinder the vacuum pull. The opposite sides of the pistons must also be provided with means for overcoming the vacuum that they would set up during this movement. Means for taking care of these conditions are provided in the structure of the core of the valve 9 and the outlet connections which connect to or are indirectly connected to each end of the double acting cylinders 4 and 5. In this particular instance the front ends of the cylinders 4 and 5 which may be designated as A and C respectively, are adapted to connect with the atmosphere through two of the openings 14 provided in the manually operated valve 9. The end A of the cylinder 4 is connected to the valve 9 by means of a pipe 13 and to the atmosphere via the opening or hole 14 of the core of the valve 9. The hole 14 is positioned relative to the slot 12 of the core 11 so that when the slot is positioned as to direct the pull of the vacuum on the rear end of the piston 5 one of the openings 14 will register with the pipe connection 13 of the valve 9. The vacuum of the tank 6 is directed through the slot 12, through a pipe 15 which is connected to the cup portion of the valve 9 and the end of D of the cylinder 5. The rear end of the cylinder 4, or the end B, and the front end of the cylinder 5 or end C are also provided with atmospheric connections 13' and 15' respectively, which pass through an automatic valve 16 that is connected to the valve 9 by means of the pipe 17.

The automatic valve 16 may be made in a similar manner to the structure of the manually operated valve 9 which consists of a cup member adapted to contain an oscillating core 19. The core 19 is also provided with the slot 20 and holes 14' similar to the structure of the valve 9. The valve 16 is adapted to be operated by a governor 21 which is actuated by the motor of the vehicle. The holes 14 and 14' of the valves are so positioned relative the slots of the cores as to register with and open all of the outlet pipes that are not used to carry the vacuum.

The governor 21 may be of the conventional design but is preferably driven through an over riding clutch so that the deceleration of the governor will be gradual instead of a sudden deceleration as the speed of deceleration of the usual internal combustion engine. The object of manipulating the automatic valve 16 by means of a governor is to position the valve so that the vehicle differential gears may be positioned in a predetermined ratio in accordance with the revolutions of the engine. It is understood that the pistons 1 and 2 are held rigid with each other by means of their shaft 3 and the shaft 3 is connected with the differential so as to control the drive of the vehicle by the movement of the two valves 9 and 16.

The over riding clutch of the governor consists of a fly wheel 22 made rigid with the shaft 23 of the governor and having a tire 24 which extends, in width, to an extent so that a disk 25 may rotate within the inner periphery of the tire. The diameter of the disk 25 is a fraction less than the inner periphery of the tire 24 and it is rotatably journaled or positioned on the shaft so that it will rotate within the inner periphery of the tire and adjacent the body of the wheel 22. The disk 25 is provided with a sleeve 27 rigid therewith and adapted to be rotatably journaled on the shaft 23 or on the sleeve of the wheel 22. A pulley 26 is made rigid with the sleeve 27 of the disk 25 and adapted to be driven by the motor of the vehicle. The outer periphery of the disk is provided with a plurality of slots 28 in which is carried a ball or roller 29. The slots 28 and their rollers or balls 29 co-act to engage the wheel 22 so that when the disk 25 is driven by the motor of the vehicle the governor will be caused to rotate through the wheel 22. The slots 28 are set angularly within the circumference of the disk 25 so that one end of the slot is gradually decreased in depth until it conforms with the circumference of the disk 25 and the other end of the slot is sloped to a depth sufficient to hold its roller or ball 29 in a position so that it will not contact or engage the tire of the wheel 22. This structure causes the centrifugal force of the roller or ball 29 of the slot 28 to travel outwardly and engage and drive the wheel 22 when the disk is rotated but the momentum of the wheel 22 will not be affected or hindered by a decrease in speed of the disk 25, thus the motor will drive the governor at a speed in keeping with the revolutions of the motor but when the motor is decelerated the governor will be permitted to decelerate independent of the deceleration of the motor and at such a rate as would be caused by the size and weight of the fly wheel 22 of the governor. The object of this form of operating the governor that controls the automatic valve is to provide automatic means of controlling the differential gears in accordance with the speed of the motor in such a manner as to cause a change of speed ratio only when the motor is able to attain a given speed forward, during the pull of the vehicle, and when the vehicle is on such an incline that the pull of the same will tax the motor to such an extent that the forward speed of the vehicle will decrease below a predetermined speed. This structure eliminates the possibility of ever lunging against a slow or dead motor.

The governor 21 is adapted to actuate the core 19 of the valve 16 by means of link bar 30 which is pivotally connected to the valve 16 and the arms of the governor. The core of the valve 16 is provided with a shaft 31 and the shaft 31 is provided with a bar 32 rigidly attached at right angles thereto. One end of the link bar 30 is pivotally attached to the arm 32 and the other end of the bar 30 is attached to a crank arm 33 which is pivotally attached to an extended member or bracket 34 made integral with the governor housing. The crank arm 33 is provided with a yoke 33' which is adapted to contact with and be actuated by the reciprocating collar of the governor arms so that the speed of of the governor 21 will cause a reciprocation of the shaft 30, thus causing an oscillation of the core 19 of the valve 16. The extent of the speed of the governor 21 determines the position of the automatic valve 16 for changing the speed ratio in the differential. For example the speed of the engine may be such that the forward movement of the vehicle would be sufficient to drive the vehicle in a higher ratio. When this forward speed is attained the axle or differential gears will be positioned by the automatic mechanism so that the operator may, at his option, drive the vehicle in the higher gear ratio. If the vehicle speed drops below this desired or predetermined speed the automatic mechanism positions the gears so that the operator may use the slower speed gears by retarding the accelerator of the motor. The speed of the governor 21 which governs the position of the gears from one to the other of the axle ratios may be varied by the operator of the vehicle, at any time, by means of a dash switch or lever 35. The lever 35 is adapted to control the governor action by means of a resilient structure which is pivotally connected to the crank arm 33 of the governor.

This control of the variations of speed required to actuate the automatic mechanism consists of a bar 36 slidably mounted on the frame 34 and adapted to be reciprocated therein by means of a link bar 37 which is pivotally connected with the arm 33. One end of the bar 37 is pivotally connected to one arm of the crank arm 33 and the other end is pivotally connected to the bar 36. The bar 36 is provided with a resilient means for varying the power required of the governor and its crank arm 34 to reciprocate the same. This device consists of a cylindrical shaped member 38 rigidly positioned adjacent the bar 36 and at right angles thereto. The end of the cylindrical member 38, opposite the bar 36, is internally threaded and provided with a plug 39 which is screwed therein. The end of the plug 39 which extends into and through the cylinder 38 is provided with a spring 40, one end of which is made fast with the end of the plug 39 and the other end of the coil spring 40 is provided with a ball 42 made rigid therewith. The portion of the bar 36, adjacent the cylinder 38, is formed in an inclined surface 41 which is triangular in form and formed longitudinally on the bar 36. The ball 42 is adapted to resiliently engage and ride upon the surface 41, and the amount of friction of the ball against the surface 41 may be varied by screwing the plug 39 in and out of the cylinder 38 by means of the lever 35. The apex of the surface 41, which extends in the direction of the cylinder 38, permits the bar 36 to travel under the ball 42 to the extent that the ball 42 may ride upon either slope of the triangular contour or track 41. The advantage of this form of track for the friction contacting member permits the reciprocation of the bar 36 to be controlled during its movement from either high speed to lower speeds and vice versa, upon either of the slopes from the apex. The outer end of the plug 39 is provided with a worm gear 43 made rigid therewith and adapted to mesh with and be driven by means of a worm 44. The worm gear 44 is made rigid with an axle 45 which is elongated and extended to connect with the control lever 35 so that when the lever 35 is turned by the operator the gear 44 will be rotated and drive the worm gear 43 so that the plug 39 will be caused to screw into or out of the cylinder 38, depressing or releasing the spring tension of the ball 42 against the track 41. The gears 43 and 44 are held in operative relation by means of a bracket 45' which is formed so as to provide bearing surface for the axle or shaft of the gear 44 and adapted to be anchored to the plug 39. A portion of the bracket 45' is formed to fit around the plug 39 adjacent the gear 43 and another portion is formed to ride upon the face of the gear, thus clamping the bearing surface of the gear 44 to the gear 43. This structure of the bearing bracket permits the gears to be held in operative relation so that they may rotate and also reciprocate together as the plug 39 is screwed into and out of the cylinder 38. The reciprocating shaft 3 is adapted to be operatively connected with the differential of the vehicle, preferably by mans of a flexible shaft 46, one end of which is attached to the free end of the shaft 3 and the other end of which is attached to a crank arm 47 of the differential. The crank arm 47 is pivotally attached to the differential housing and adapted to operate the yokes of a pair of sliding gears of the differential. The differential is designed to provide two ratios of drive of the wheels of the vehicle as well as means for causing a free-wheeling action for the wheels, as described and claimed in my previous Patents, Number 1,857,955 and Number 1,915,606. This differential is provided with a pair of differential units one of which is driven by the propeller or drive shaft in the usual manner and the other is driven by the first named unit. The unit A which is driven by the drive shaft of the motor is provided with free-wheeling mechanism 48 the body of which is rotatably mounted on one of the two axles or axle 50 of the differential. The free-wheeling mechanism consists of one or more disks 49 rigidly attached to the axle 50 of the differential and provided with ball or roller contacting elements for engaging the inner periphery of the housing 51 thereof and driving the same. The structure of the contacting elements are similar to the over riding clutch mechanism of the governor, as described above. The housing of the disk or disks 49 consists of a drum 51 which is adapted to contain the disks and this drum is provided with a sleeve 53 which is rotatably mounted on the axle 50 and made rigid with the housing 54 of the driven differential unit of the differential. The drum 51 is provided with a cap 55 securely attached thereto which has a splined sleeve 56 rotatably mounted on the axle 50. A clutch 57 is slidably mounted or keyed to the sleeve 56 so that it may be slid thereon for engaging and disengaging an internal clutch 58 which is made rigid with the housing of the differential. A clutch 59 is slidably keyed to the axle 50 adjacent the free end of the splined sleeve 56. This clutch is adapted to be actuated to engage and disengage the splined sleeve 56 for locking the same with the axle 50, its housing 51 and unit A with the axle 50. The two clutches 57 and 59 are the pair of clutches mentioned above which are actuated by the crank arm 47. The sliding clutches 57 and 59 are provided with a common yoke 60 so that they may be moved or slid upon their respective anchorage simultaneously. The yoke 60 is pivotally attached to the arm of the crank 47 opposite the flexible shaft connection 46 which leads from the vacuum mechanism.

The reciprocating shaft 3 of the pistons 1 and 2 is adapted to be moved to three positions for conditioning the vehicle for driving in the various ratios. When the shaft 3 is moved forward by means of the vacuum pull of the piston 1 the vehicle is conditioned so that the operator may drive the same in the low axle ratio, namely, in the three forward speeds as well as in reverse gear.

When the vacuum mechanism is set in the first position or the position for conventional drive of the vehicle the gear formed clutches will be set so that the clutch 57 will be disengaged from the clutch 58 and the clutch 59 will be engaged with the sleeve 56 of the free-wheeling mechanism 48. This arrangement of the clutches causes the differential unit A to drive the wheels of the vehicle directly in the usual manner, the housing of the unit A being made rigid with the axle 50 through the members 53, 51, 55, 56 and 59 which is keyed to the axle 50. This form of locking the unit A with the axle 50 locks out the free-wheeling action of the disk or disks 49.

When the manual valve is moved to the second position or the position for conventional drive and free-wheeling, the shaft 3 is moved to midway of its extremity of reciprocation and the clutch 59 is moved out of engagement with the splined member 56 and the clutch 57 is moved towards the internal rigid clutch 58 so that the unit A will engage and drive the axle 50 through the free-wheeling mechanism 48 only. When the vehicle is being driven in this position the operator is also permitted to utilize the higher ratio in the differential. This is done by depressing the clutch 61 of the vehicle which is connected to a locking mechanism provided on the vacuum unit by means of a link bar or flexible connection 62 which will permit the clutches 57 and 59 to be moved still further and bring the clutch 57 into mesh with clutch 58 which will hold the member 57 against rotation. This also holds the housing 54 of the unit A against rotation which transfers the drive of the wheels of the vehicle through the other unit of the differential.

When the manually operated valve is set to the third position the vehicle may be driven in all forward speeds in accordance with the automatic control and the desires of the operator. In this position the shaft 3 is moved to its extreme rear position only when the car attains a speed ascertained by the position of the lever 35. For instance when the valve 9 is set in the third position, or termed the full automatic position, the shaft 3 will not travel to its extreme rear position until the speed of the vehicle attains a predetermined forward speed. When this speed is attained the automatic valve 19 will be actuated by the governor so that the vacuum is directed to pull the piston 2 to the rear of the cylinder and move the shaft to the extreme rear position, thus moving the differential mechanism so that the vehicle will be driven in the higher ratio which is provided in the differential. As the speed of the vehicle decreases the governor will actuate and move the automatic valve 19 back to its original position, that is to a position where the shaft 3 is moved to its central position, and held in this position until the speed of the vehicle again attains the desired position for an increase in ratio. It will be understood though that although the shaft is positioned at these two positions through the automatic valve 19 and the governor in accordance with the speed of the engine and vehicle the operator does not have to use the increase or decrease in ratio in the axle except at his option. It is apparent that by the use of this system that the operator of the vehicle has complete control of the vehicle at all speeds of the same, and may shift the transmission gears or the axle gears at will, to drive the vehicle in any gear. The structure of the differential permits him to safely operate up an incline in the higher gear ratios without the usual danger of a stalled engine and then an uncontrolled vehicle which is in danger of rolling back down the incline and out of control, because the differential is provided with a co-acting part with the higher ratio gears which automatically lock the car against reverse movement, during the time it is being driven in the higher ratios attained in the axle. It is also possible to shift the transmission gears at will during the time the car is being driven in the higher differential gear ratios, even into the transmission reverse gear, because of the automatic control of the position of the gears in the rear end and the free-wheeling facilities therein. It has been found during the use of this invention, throughout several months of driving over most every type of road, that the operator has had complete control of the vehicle and secured greater gasoline mileage than was ever attained in the same vehicle without the application of this invention.

When the manual valve is positioned to the third position or the position so that the higher ratio of the differential may be used for the forward movement of the vehicle the vacuum is directed through the automatic valve 19 and to the vacuum mechanism, in accordance with the speed of the vehicle. When the vehicle is being driven in this position the automatic valve 19 is actuated by the governor so that the fluctuation of the speed of the vehicle will cause the clutches 57 and 59 to be slid from a position of engagement with the stationary clutch member 58 to a position where neither of the clutches 57 and 59 are engaged with their respective clutches. The object of causing the clutches 57 and 59 to be slid back and forth from these positions is that when the vehicle is moving forward at a speed below the desired speed for using increased differential ratio the vacuum mechanism will automatically position the mechanism so that the operator may drive in the lower speed or in the lower ratio of the differential. When the vehicle has attained the desired speed for driving the same in the increased differential ratio the clutches will switch back, by the action of the automatic valve 19, so that the clutch member 57 will engage the stationary clutch member 58 and cause the differential mechanism to act to permit the operator to drive in the higher ratio of the differential.

A locking mechanism is provided for the vacuum unit so that the unit will not position the differential in a higher ratio without the aid of the operator. The locking mechanism consists of a crank member 63 pivotally attached to a bracket 64 of the vacuum unit housing and adapted to be oscillated by the movement of the reciprocating shaft 3. The crank member 63 is provided with an arm 65 made integral therewith and pivotally attached to the shaft 3 so that the shaft 3 will swing the arm member. The body of the arm member 63 is formed in fan shape, the swinging end of which is curved from an arc described from a point in the center of the pivotal point of the same. A shaft 66 is slidably mounted in bearings 69 of the bracket 64 and positoned so that one end will bear against the outer periphery of the arc of the arm member 63. The end of the shaft 66 that engages the member 63 is provided with a point which is adapted to enter a tapered opening 67 provided in the outer periphery of the arc portion of the member 63 for holding the member 63 and the shaft 3 against movement. The lock shaft 66 is positioned so that its point will only enter and lock the shaft 3 against movement when the shaft 3 is midway of its extreme positions or in its required position when the vehicle is being driven in the conventional gearing with free-wheeling.

The locking and the unlocking of the shaft 3 by means of the lock shaft 66 and the arm 63 is controlled by the clutch 61 of the vehicle. The lock shaft 66 is normally held in locking position by means of a coil spring 68 which is carried by the shaft 66. One end of the spring 68 is adapted to bear against one of the bearings of the shaft 66 and the other end bears against a collar 69 made rigid with the shaft 66 so that the tension of the same will tend to slide the shaft 66 towards and against the arm member 63. One end of a link bar or flexible cable 46 is pivotally connected to the end of the lock shaft 66, opposite its locking point, and the other end is pivotally attached to the clutch 61. This structure of the locking mechanism permits the operator of the vehicle to control the action of the shaft 3 so that it will not be permitted to be moved by its vacuum pull to a position for driving the vehicle in the higher ratio of the differential until he wishes to make the change himself. When the shaft 3 is locked in this position the vehicle may be driven in the conventional or usual transmission ratios until the driver decides to press the clutch and release the shaft 3 so that it will actuate the differential gears for driving the vehicle in the higher differential ratio.

When the pistons 1 and 2 of the pneumatic unit are positioned midway of their extreme reciprocating movement, or as shown in Fig. 6 with the vacuum directed to the portion C of the cylinder 5, the locking mechanism holds the shaft 3 from any sliding movement. There are times, during the time when the device is in this position, when it is necessary to depress the clutch but it is desirable that the shaft 3 still retains the position shown. When the clutch of the vehicle is depressed the vacuum would pull the cylinder 5 forward but for the relief valve 16'. The valve stem of the valve 16' normally extends to within a minute fractional distance of the face of the pistons 2 when the piston 2 is midway of its cylinder 5. When the vacuum pull starts to pull the piston 2 forward the piston will contact with the valve stem and open the valve 16' releasing the vacuum, thus causing the valve to have a minute reciprocation from the central position, relative to its cylinder, to such a distance forward as to open the valve 16'. This distance of travel is compensated for in the connecting mechanism of the vacuum unit with the differential so as to eliminate any movement of the differential gearing. It is apparent that the valve 16' will also automatically co-act with the piston 2 when the piston 1 is pulled forward, during the positioning of the same for conventional drive, to relieve the pressure or compression in the portion C of the cylinder 5.

From the above description, it is apparent that my control unit or the vacuum actuated element may be adapted to control any and all of the gearing associated with the differential of a vehicle or machine; and preferably co-acting with the various gearing so as to be set to act upon the same to move each gear to its desired position when the operator depresses the clutch of the vehicle or manually actuates means for releasing the lock of the unit. In this instance, when the clutch is depressed the unit is unlocked and permitted to move to attain a higher ratio in the differential, and when the accelerator of the vehicle is released the engine of the vehicle will decelerate and bring the forward speed of the vehicle down to a desired speed to cause the automatic mechanism to actuate the control element for shifting the differential gears to a lower ratio.

What I claim is:

1. A speed control for motor vehicles and the like comprising a differential having transmission gears for varying the drive ratio of the wheels of said vehicle, a control unit for said gears and a pneumatic means associated with said motor for energizing said unit, a manually actuated valve for directing the flow of the pneumatic energizing force to said unit for positioning said gears, an automatic valve interposed between said unit and said first named valve for positioning said gears in accordance with the speed of said vehicle, manual means for locking said unit against movement by said automatic valve and a motor driven governor for actuating said automatic valve.

2. In a speed control for motor vehicles and the like comprising a differential having transmission gears coacting therewith and adapted to vary the ratio of the speed of said motor with the speed of the wheels of said vehicle, pneumatically actuated means for shifting said gears, and a governor driven by said motor for controlling said shifting means in accordance with the speed of said vehicle, manual means for locking said gears against movement by said governor driven unit.

3. In a speed control for motor vehicles and the like comprising a differential having a transmission, a control unit for said transmission and pneumatic means for actuating the same, a manually actuated valve for directing the pneumatic energizing force of said unit for selecting the various speeds of said transmission, and a motor actuated valve associated with said manual valve for controlling said selection in accordance with the speed of said vehicle, and means for holding said motor actuated valve inoperative.

4. In a speed control for motor vehicles and the like comprising a differential having variable speed gears, a pneumatically actuated unit for controlling said gears, manual means for directing the pneumatic power to said unit, and means associated with said manual means and driven by said motor for automatically controlling the action of said unit with the speed of said motor, and means for holding said motor driven means inoperative.

5. In a speed control for motor vehicles and the like comprising a differential having a transmission mechanism carried in the housing thereof, a control unit for said mechanism having pneumatic means associated with said motor for actuating the same, a manually actuated valve for controlling the flow of said pneumatic energy to said unit, a governor controlled valve interposed between said manual valve and said unit for directing said flow in accordance with the speed of said motor and actuated by the motor of said vehicle, means for locking said unit in a neutral position relative to the position of said mechanism and against the energizing power, and said locking means adapted to be actuated by the clutch of said vehicle.

6. In a speed control mechanism for motor vehicles and the like comprising a differential having variable speed gears for controlling the ratio of the wheels of said vehicle with the speed of said motor, a control unit for positioning said gears for the various ratios, means associated with said motor for supplying a flow of energy to said unit for actuating the same, manual means for directing said energy to said unit for shifting said gears to selected positions, means associated with said manual means and driven by said motor for automatically controlling said selection with the speed of said vehicle, said manual means adapted to be positioned so as to hold said automatic means inoperative, and means actuated by the clutch of said vehicle for locking said unit against said flow of energy.

7. In a speed control mechanism for motor vehicles and the like consisting of a differential adapted to vary the speed ratio of the wheels of said vehicle with the speed of said motor, a speed control unit for said differential, means for directing a flow of energy to said unit for actuating the same, manual means for directing said flow of energy to said unit for governing the scope of the operation of said unit, motor driven means superseding said manual means for automatically changing the scope of operation of said unit in accordance with the speed of said vehicle, manual means for controlling said automatic changing means so that the same will actuate at a predetermined speed of said vehicle, and means actuated by the clutch of said vehicle for locking said control unit.

8. In a speed control mechanism for motor vehicles and the like consisting of a differential having variable speed gears associated therewith, a control unit cooperating with said gears and adapted to be actuated by the motor of said vehicle, a manually operated means for controlling the action of said unit, a governor for automatically controlling said unit in accordance with the relative speed of said motor with the speed of said vehicle and manual means for holding said governor inoperative.

9. In a speed control mechanism for motor vehicles and the like consisting of a differential having variable speed gears, a control unit for positioning said gears, said unit adapted to be actuated by a flow of power from the motor of said vehicle, a manually actuated valve for controlling said power flow to said unit, and a motor actuated valve interposed between said first named valve and said unit for automatically controlling said power flow in accordance with the relative speed of said motor with the speed of said vehicle, and said unit being adapted to condition said gearing so that the vehicle may be driven in either of said transmission gears while cooperating with either of said differential gear ratios.

10. In a speed control mechanism for motor vehicles and the like consisting of variable speed gears adapted to coact with the differential of said vehicle, a control unit adapted to position said gears, said unit being actuated by a flow of power from the motor of said vehicle, a manually actuated valve for controlling said power flow, a motor actuated valve interposed between said first named valve and said unit for automatically controlling said power flow, and a clutch actuated means for locking said unit against movement by said power flow.

11. In a speed control mechanism for motor vehicles and the like consisting of variable speed gears carried by the differential thereof, a control unit for positioning said gears, said unit adapted to be actuated by the vacuum set up by the motor of said vehicle, clutch actuating means for causing said unit to lock against the force of said vacuum, and motor actuated means for automatically directing the movement of said unit to select the desired gear in accordance with the relative speed of said motor with the speed of said vehicle.

12. In a speed control mechanism for motor vehicles and the like consisting of variable speed gears carried by the differential thereof, a control unit adapted to position said gears, said unit being actuated by the vacuum of the motor of said vehicle, manual means for controlling the flow of said vacuum to said unit, a governor actuated means for controlling said unit for positioning said gears in accordance with the relative speed of said motor and said vehicle, and means cooperating with the clutch of said vehicle for holding said unit inoperative.

13. In a speed control mechanism for motor vehicles and the like, a control unit adapted to position the gears of said vehicle, said control being adapted to be actuated by a flow of power from the motor of said vehicle, manual means for directing said flow to said unit, motor actuated means interposed between said manual means and said unit for automatically controlling the action of said unit in accordance with the relative speed of said motor with said vehicle, and a locking means for said unit adapted to be actuated by the clutch of said vehicle.

14. In a speed control mechanism for motor vehicles and the like having variable speed differential gears, a control unit for positioning said gears, said unit being actuated by a flow of power from the motor of said vehicle, a manually actuated valve for controlling the flow of said power to said unit, a motor actuated valve interposed between said manual valve and said unit for automatically controlling said flow in accordance with the speed of said motor, said last named valve being actuated by said motor, and means for holding said unit against the force of said flow of power.

15. In a speed control mechanism for motor vehicles and the like having variable speed differential gears, a control unit for positioning said gears, said unit consisting of a pair of pistons adapted to be actuated by the vacuum of said motor, manual means for directing the vacuum to said unit for controlling the extent of the movement of said unit, a motor driven governor controlled means interposed between said manual means and said unit for directing said vacuum to said unit in accordance with the speed of said motor, manual means for varying the action of said governor, and means cooperating with the clutch of said vehicle and said unit for causing said unit to be actuated by said vacuum.

16. In a speed control mechanism for motor vehicles and the like having a differential provided with variable speed gears, a control unit for positioning said gears, said unit being adapted to be actuated by a flow of power from said motor, motor actuated automatic means for controlling the action of said unit in accordance with the speed of said motor, means cooperating with the clutch of said vehicle for locking said unit against the action of said flow of power, and all of said control mechanism being adapted to cooperate with the transmission gears of said vehicle for driving said vehicle in either of the transmission gears simultaneously with any of the said differential variable speed gears.

17. In a speed control mechanism for motor vehicles consisting of variable speed gears having a control unit adapted to intermittently position said gears, said unit being actuated by a flow of power from the motor of said vehicle, a manually actuated valve for controlling said power flow, a motor driven valve for controlling said power flow, means for holding either or both of said valves inoperative, and manual means for adjusting said motor driven valve during the drive of said vehicle.

18. In a speed control mechanism for motor vehicles and the like consisting of a variable speed gear unit adapted to be controlled by a flow of power from the motor of said vehicle, a manually operated valve for controlling the flow of power to said unit, a governor actuated valve adapted to control said power flow, said governor being driven by the motor of said vehicle, manual means for holding one or both of said valves inoperative, and means for varying the action of said governor during the operation thereof.

SAMUEL A. B. HAMILTON, Jr.